June 5, 1928.  1,672,746
F. J. BOUSHON
STONE GATHERER
Filed Oct. 28, 1926  2 Sheets-Sheet 1
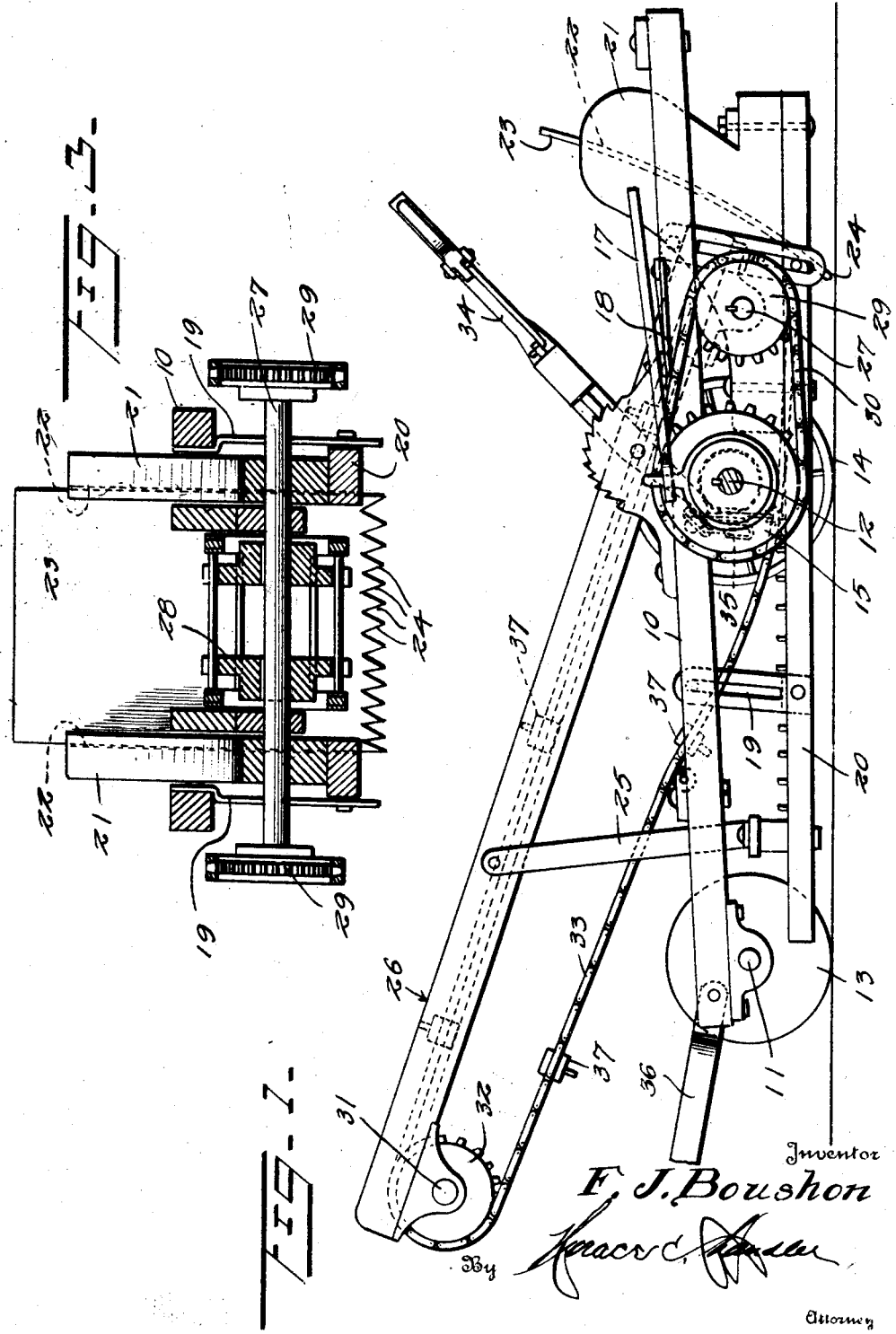
Inventor
F. J. Boushon

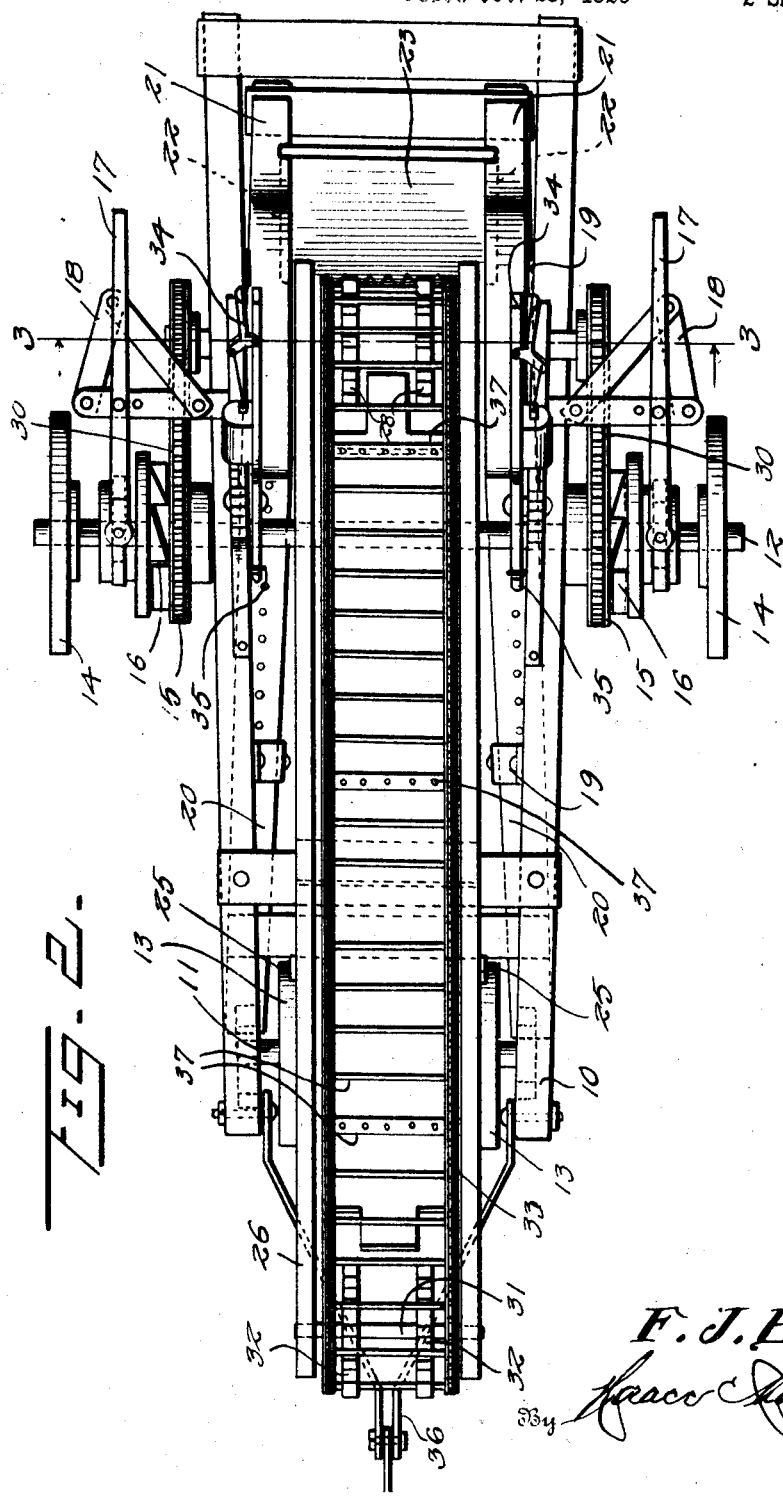

Patented June 5, 1928.

1,672,746

UNITED STATES PATENT OFFICE.

FRED J. BOUSHON, OF MELLEN, WISCONSIN.

STONE GATHERER.

Application filed October 28, 1926. Serial No. 144,872.

This invention relates to new and useful improvements in excavating machines, and particularly to machines for excavating and gathering stones from roads, fields, and the like.

One object of the invention is to provide a device of this character by means of which stones may be properly removed from the ground, and delivered to an elevator which places them in a wagon, or other receptacle, near at hand.

Another object is to provide a novel and simple means for elevating the digging element, above the ground, so that the machine may be moved from place to place.

Another object is to provide means for rendering the elevator inoperative, so that the digging means may operate alone, for the purpose of leveling a road surface.

Other objects and advantages will be apparent from the following description when taken in connection with the accompanying drawings.

In the drawings:

Figure 1 is a side elevation of a stone digging and elevating machine, made in accordance with the invention.

Figure 2 is a top plan view of the same.

Figure 3 is a vertical transverse sectional view on the line 2—2 of Figure 2, looking rearwardly.

Referring particularly to the accompanying drawings, there is shown a frame 10 having the front and rear axles 11 and 12 mounted therein, said axles being provided with the ground engaging wheels 13 and 14, respectively. On each end of the rear axle 12 is a sprocket wheel 15, and a clutch 16, whereby to throw the sprocket wheel into and out of operative connection with the axle. The clutches are actuated by the levers 17, mounted horizontally on the brackets 18, carried by opposite sides of the frame 10. Depending from the sides of the frame, adjacent the front and rear ends, are the longitudinally slotted hangers 19. Extending longitudinally beneath the frame 10, and supported in said slotted hangers 19, is a frame 20, the rear end of which is provided with the upwardly extending enlargements 21, having the arcuate grooves 22, to receive and retain the curved digger blade 23. The lower end of the blade 23 is formed with a series of teeth 24, which are adapted to dig the stones from the ground, as the machine proceeds forwardly. Secured to the forward end of the frame 20 are the uprights 25, and connected to the upper ends of said uprights are the upper forward ends of the side bars of the elevator chute 26. Extending through the rear ends of the frames 10 and 20 is a shaft 27, and secured on said shaft, within the chute, through which the said shaft also extends, are the sprocket wheels 28, while sprocket wheels 29 are mounted on the shaft, outwardly of the frame 10, for driving connection with the sprockets 15, through the medium of the drive chains 30. In the upper end of the chute 26 is a transverse shaft 31 carrying the sprocket wheels 32, and engaged around the sprockets 28 and 32 is an endless conveyor belt 33. The lower portion of the belt 33 moves adjacent the digger to draw up the stones loosened by the teeth of said digger. Pivotally mounted on the rear end of the frame 10, at each side thereof, is a lever 34, which is connected to the frame 20 by means of the links 35, said levers being adapted to be operated to raise and lower the frame 20, whereby to move the digger into and out of engagement with the ground. Suitable draft means 36 is connected with the front axle of the device. The elevating belt is provided with suitable flights 37, for carrying the stones upwardly in the chute.

What is claimed is:

A stone gatherer including a main frame, a supplemental frame suspended on and arranged within the main frame, vertical plates mounted on each side of the rear end of the supplemental frame, an endless conveyor mounted on the supplemental frame and having flights, the inner vertical faces of said plates having vertically extending arcuate grooves, and a digger blade disposed with its side edge portions in said grooves, said conveyor flights cooperating with the blade to elevate the material removed by the digger.

In testimony whereof, I affix my signature.

FRED J. BOUSHON.